United States Patent [19]
Bhandari et al.

[11] Patent Number: 5,867,692
[45] Date of Patent: Feb. 2, 1999

[54] DATA TRANSFER DEVICE OPERABLE WITH TWO TYPES OF INTERFACES

[75] Inventors: Rajan Bhandari, Chineham; Stephen Charles Olday, Basingstoke, both of United Kingdom; Mitsuaki Sugimoto; Yoshihiro Okamoto, both of Tokyo, Japan

[73] Assignees: Sony Corporation, Tokyo, Japan; Sony United Kingdom Limited, Weybridge, England

[21] Appl. No.: 833,769

[22] Filed: Apr. 9, 1997

[30] Foreign Application Priority Data

Apr. 12, 1996 [GB] United Kingdom .................... 9607690

[51] Int. Cl.⁶ .................................................. G06F 13/42
[52] U.S. Cl. ............................................ 395/551; 395/872
[58] Field of Search ..................................... 395/551, 552, 395/872, 878, 881, 873, 876, 877

[56] References Cited

U.S. PATENT DOCUMENTS

| | | | |
|---|---|---|---|
| 4,603,382 | 7/1986 | Cole et al. | 395/876 |
| 4,607,348 | 8/1986 | Sheth | 395/877 |
| 4,922,534 | 5/1990 | Gorniak et al. | |
| 5,289,580 | 2/1994 | Latif et al. | |
| 5,543,861 | 8/1996 | Harradine et al. | 348/718 |

FOREIGN PATENT DOCUMENTS

| | | |
|---|---|---|
| 0 260 392 | 3/1988 | European Pat. Off. |
| 2 265 733 | 10/1993 | United Kingdom. |

*Primary Examiner*—Thomas M. Heckler
*Attorney, Agent, or Firm*—Frommer Lawrence & Haug, LLP; William S. Frommer; Dennis M. Smid

[57] ABSTRACT

A buffer (4) has a read and write control (8, 7), an input (6), an output (5), and a transfer port (9). An SCSI interface (20) is coupled to port (9) and the read/write control (8, 7). The SCSI interface (20) implements transfer commands for transfers via the port 9 with an undefined delay. An RS 422 interface is coupled to the read/write control (8) and implements transfer commands for transfers via the input 6 and output 5, the commands being implemented with a small, defined delay synchronously with a video sync signal (SYNC).

13 Claims, 4 Drawing Sheets

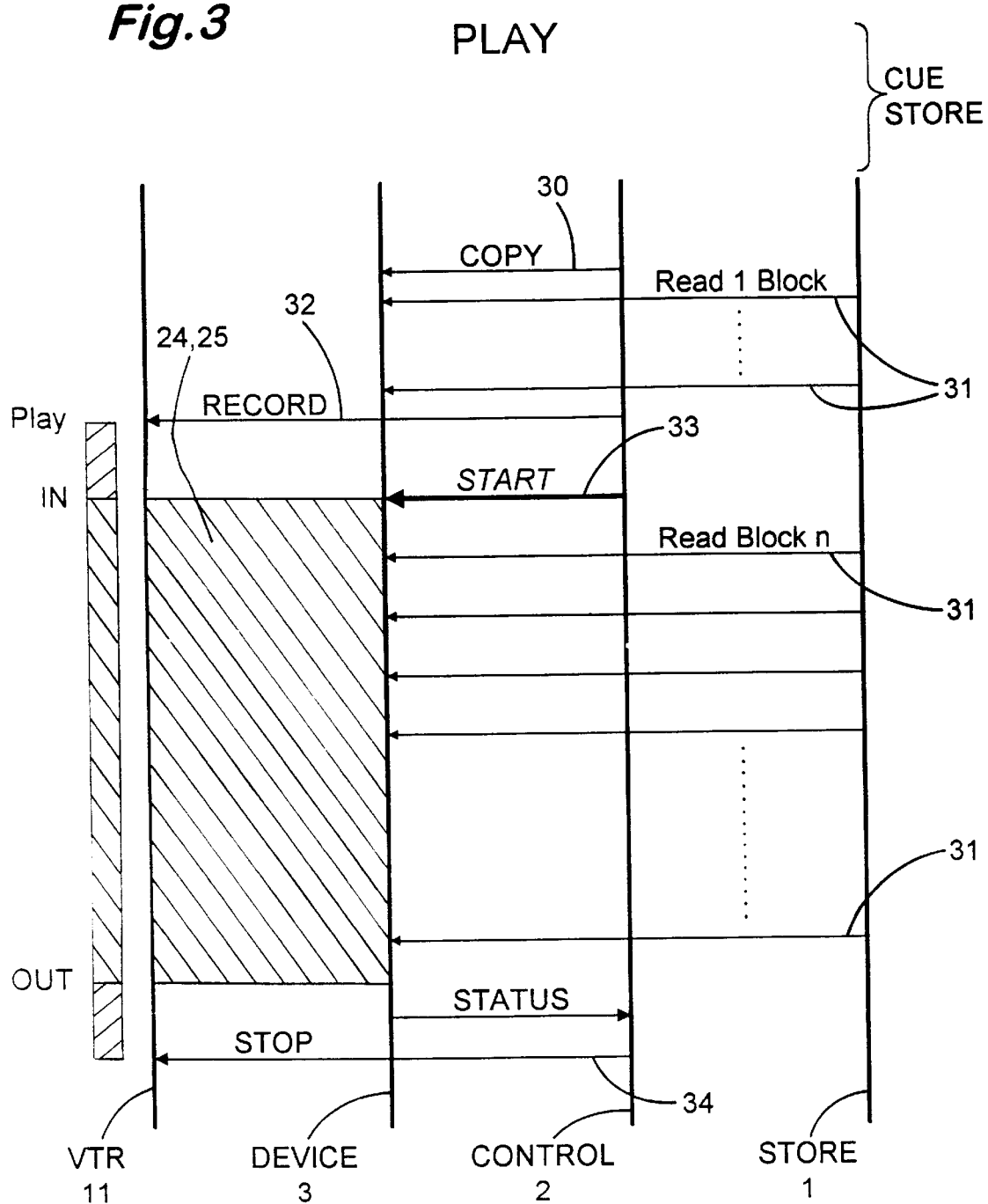

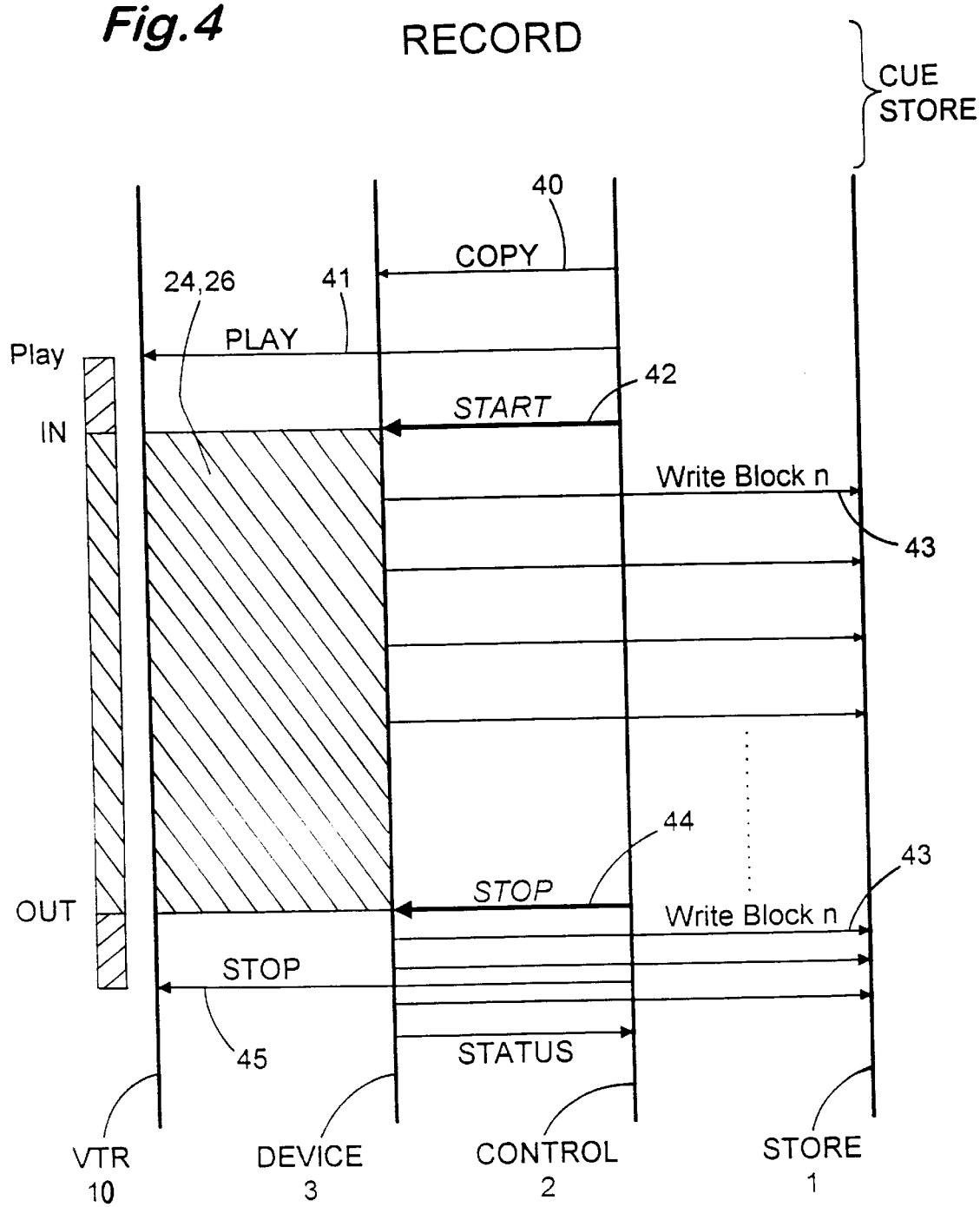

DATA TRANSFER DEVICE OPERABLE WITH TWO TYPES OF INTERFACES

BACKGROUND OF THE INVENTION

1. Field of the Invention

The present invention relates to a data transfer device.

2. Description of the Prior Art

It is known to transfer data from a data source to a data utilization device via a buffer where for instance the instantaneous rate of data production of the source is greater than the rate of use of the data by the utilization device, but the average rate of production is equal to or less than the rate of use. It is also known to use a buffer where variations in the rate of production occur and it is desired to feed data to the utilization device at a constant rate; time base correctors for example carry out such a function.

It is known to connect computers and computer peripherals via an interface. A well known interface is an SCSI-2 interface conforming to the standard ANSI X 3.131–1994 which is described in, for example, the book "The SCSI bus and IDE Interface" by Friedholm Schmidt published by Addison-Wesley, ISBN 0-201-42284-0. The SCSI standard defines the physical characteristic of the interface and a complete set of protocol and commands. A SCSI interface can support a data transfer rate sufficiently high to transfer frames of digital video data at video frame rates, e.g. up to 40M bytes/second for a 32 bit SCSI bus. SCSI however, has a complex bus protocol and a complex set of commands.

It has been found that although data can be transferred via a SCSI interface at sufficiently high rate once transfer begins, the timing of the transfer cannot be accurately set because of the need to implement the complex bus protocol and because of variations in timing caused by SCSI controllers which implement the protocol and commands.

Other simple standard interfaces such as RS232 (described in the book mentioned above) and RS422 are also well known. The standards for such interfaces define the physical characteristics of the interfaces. A set of protocols may be defined for a particular application of the standard.

SUMMARY OF THE INVENTION

An object of the invention is to provide a data transfer device which allows transfer of data but at a predetermined data transfer rate and also with a well defined timing.

According to one aspect of the invention, there is provided a data transfer device comprising:

a buffer having a control means for controlling the transfer of data into and out of the buffer, a first input and output arrangement and a second input and output arrangement;

a first interface arrangement coupled to the first input and output arrangement and to the control means, the first interface arrangement being arranged to cause the transfer of data to and from the buffer via the first input and output with an undefined time delay and, a second interface coupled to the control means for causing the control means to transfer data to and from the buffer via the second input and output arrangement, the transfer occurring with a defined time delay.

Thus, the data transfer device of the present invention allows the timing of the transfer of data to occur at a well defined time by use of a simple protocol (such as RS422) in which the timing of operation is well defined.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 3 is a timing diagram explaining the operation of the transfer device of FIG. 2 in a playback mode;

FIG. 4 is a timing diagram explaining the operation of the transfer device of FIG. 3 in a record mode.

DESCRIPTION OF THE PREFERRED EMBODIMENTS

Figure 1:
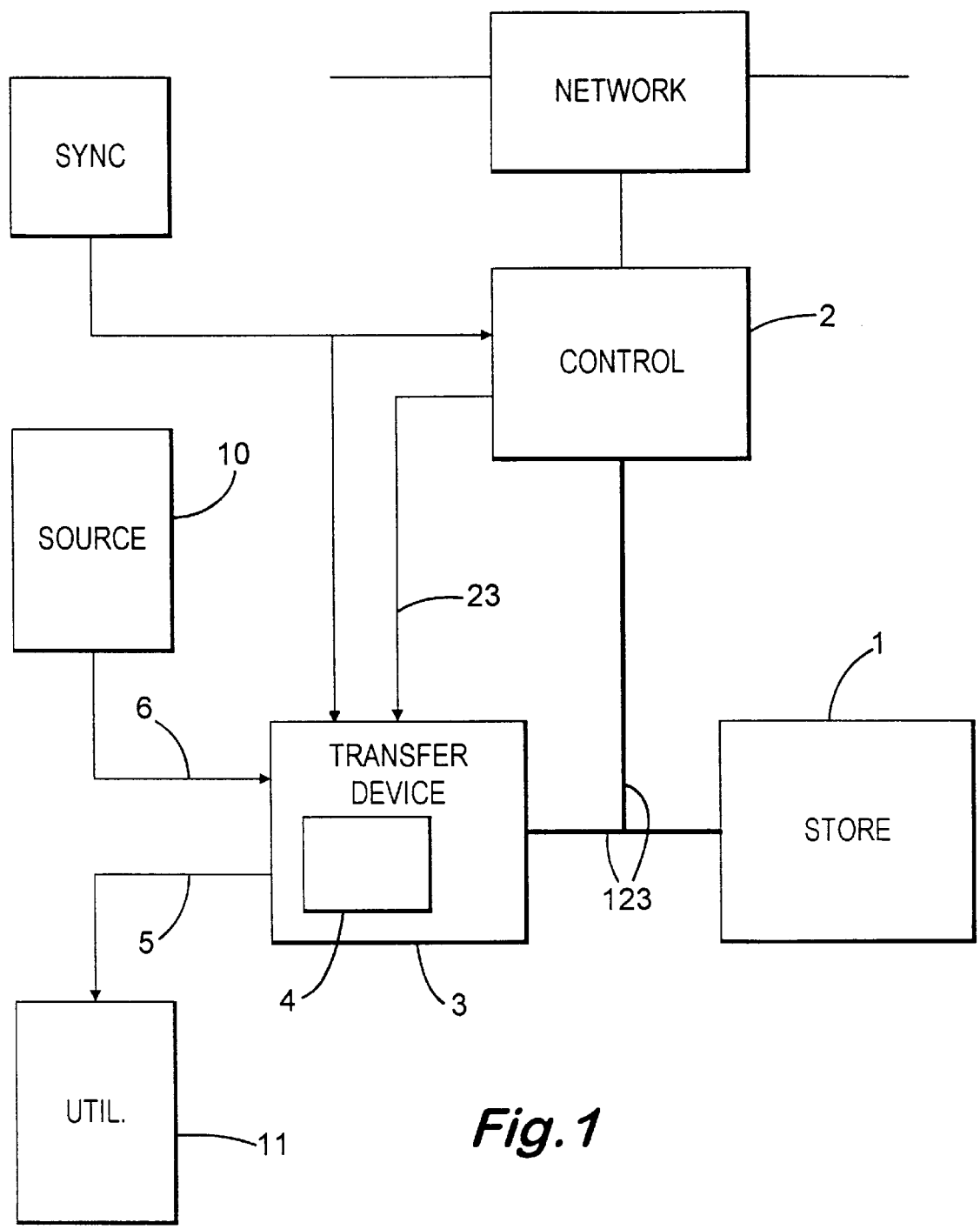
FIG. 1 is a schematic block diagram illustrating an application of a data transfer device according to the present invention.

Referring to FIG. 1, consider a television studio such as a newsroom where it is desired to a) record in a store 1 well defined sections of video from source 10 and b) playback video recorded in the store 1 at well defined times to a utilization device 11.

In the context of this illustrative example "well defined" means to the accuracy of 1 video frame boundary.

Consider first, playback of video recorded in the store 1. A workstation 2 has for example a playlist listing the times at which various sequences of video are to be played.

The store 1 is any suitable form of video data recorder and operates independently of studio sync. To play-back a particular video sequence, the sequence must be cued-up. That is the medium e.g. tape on which the sequence is recorded must be located and the portion on the tape at which the sequence is recorded must be located. Cueing-up is a relatively slow process and must be started well before the required play-back time defined by the playlist. The store 1 is coupled to the workstation 2 and to a data transfer device 3 via a SCSI-2 interface 123. Under the control of the workstation 2, the data is read out from the Store 1 via the SCSI-2 interface to a data transfer device 3. The SCSI-2 interface implements a complex protocol and set of commands. It is not possible to guarantee that an operation transferring the data will actually take place at a predictable fixed time from issuing the initial instruction which commences the transfer. It is possible to guarantee that transfer will take place within a predictable maximum time limit.

The data is transferred from the store 1 to a buffer 4 in the data transfer device 3.

The data must be transferred from the buffer 4 to a video output port 5 of the transfer device 3 synchronously with studio sync and also at the correct time according to the playlist. To do that the transfer device is coupled to the workstation 2 by an RS 422 interface 23. The RS 422 interface 23 implements a simple protocol and it is possible to guarantee that a command issued via the RS 422 interface will be implemented within a short fixed time delay of less than one field interval. The workstation issues an instruction transferring the data stored in the transfer device 3 during a field interval before a frame synchronisation signal SYNC and the transfer takes place at the occurrence of the SYNC signal.

Consider now recording of video data in the store 1. The video data is received at an input port 6 of the data transfer device 3 synchronously with the studio SYNC from a source 10 which in this example is under the control of the workstation 2. The workstation cues up the store 1 before activating the source. Once the store 1 is cued, the workstation activates the source 10 which sends video data to the transfer device.

It is desired to record only a particular sequence of video of a defined time duration beginning and ending at defined times.

The workstation 2 accurately defines via the RS 422 interface the times at which transfer of data into the buffer 4 in the transfer device 3 begins and ends.

The data is then transferred asynchronously with respect to studio sync to the store 1 via the SCSI-2 interface.

Thus, a simple interface and protocol (e.g. RS 422) which has a defined response time is used to provide fine control of a device for which coarse control is provided by a complex interface and protocol (e.g. SCSI-2) which has an undefined response time.

Figure 2:
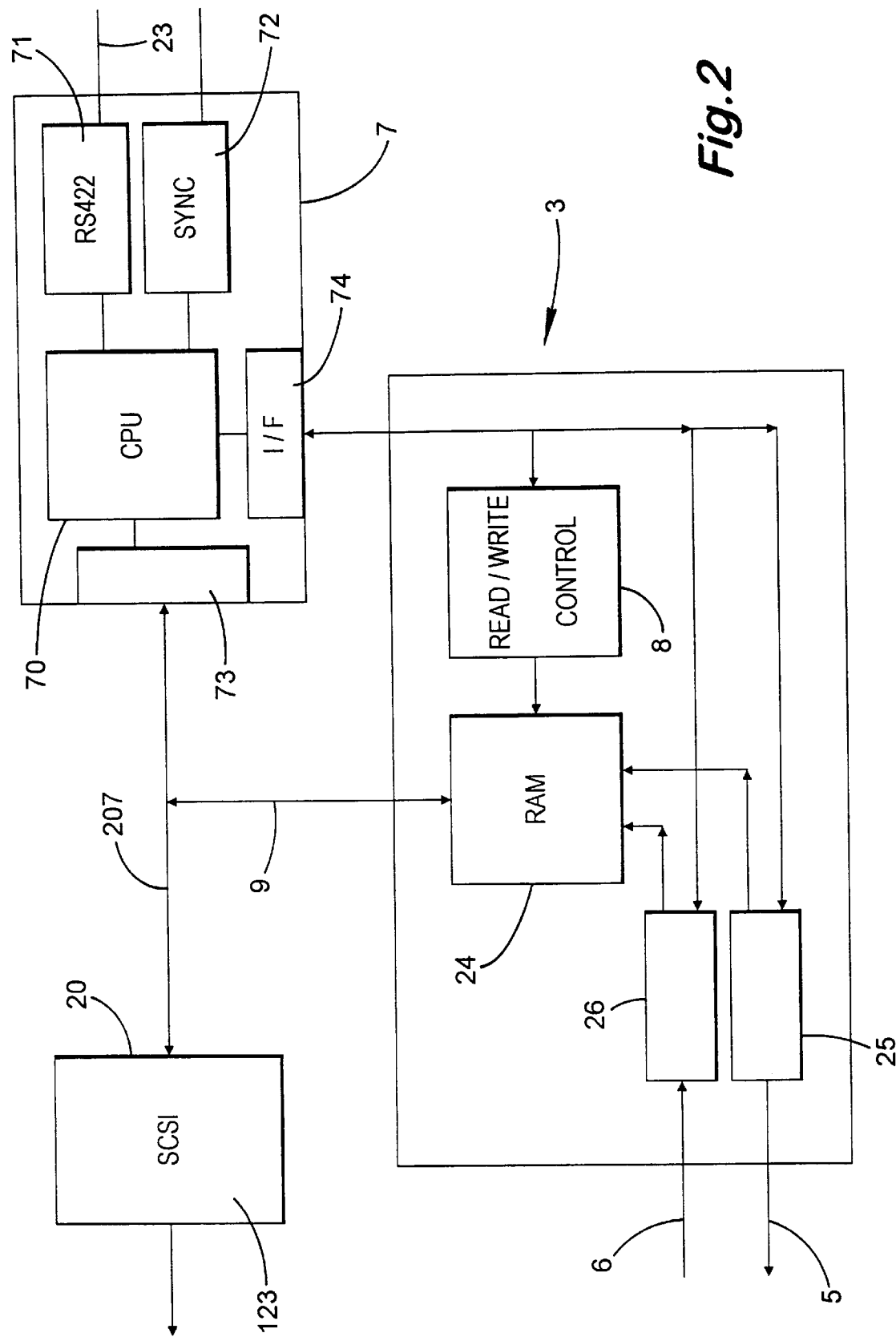
FIG. 2 is a schematic block diagram of an illustrative data transfer device according to the present invention.

An illustrative example of the data transfer device 3 is shown in FIG. 2.

A known SCSI-2 processor 20 forms part of the SCSI-2 interface 123 and is coupled to a processor 7 via an internal bus 207. The buffer 4 is provided by a Random Access Memory (RAM) 24, a read/write control 8, and further buffers 25 and 26, which may be FIFOs. The processor 20 comprises conventional circuits. These circuits are a CPU 70 coupled to a physical serial, RS422, interface 71 for receiving therefrom the RS 422 commands, an interface 73 with the SCSI processor 20, an interface 74 with the read/write controls, and a circuit 72 which responds to video SYNC signals to produce interrupts for the CPU 70. The CPU implements the RS 422 command set.

The video output port 5 is coupled to the RAM 24 via the further, output buffer 25, and the video input port 6 is coupled to the RAM 24 via the further, input, buffer 26. The buffers 25 and 26 allow data to be transferred between the RAM 24 and the ports 5 and 6 and compensate for any differences in clock rates between the transfer device 3 and the devices to which the ports 5 and 6 are coupled. The buffers 25 and 26 may also provide matching of different bus sizes inside and outside the transfer device 3.

Writing and reading of data to and from the RAM 24 and buffers 25 and 26 is controlled by the Read/Write control circuit 8, which is controlled by the processor 7. Read/Write control circuits are well known in the art.

The SCSI-2 interface conforms to the standard described in ANSI X3.131–1994. In particular it implements the COPY command. Those skilled in the art will appreciate that references hereinafter to issuing the COPY command implicitly include references to associated SCSI operations necessary to implement the command in accordance with the standard. The associated operations are defined in the SCSI standard and do not need to be described herein. The ANSI standard is well known and SCSI-2 interfaces which conform to the standard are well known. Accordingly a detailed description of the interface is unnecessary.

The RS 422 interface is well known and defines physical characteristics. It has associated with it a set of commands. The RS 422 interface of the present embodiment of the invention implements 3 commands: STOP; RECORD; START/PLAY; which have respective opcodes.

The RS 422 physical interface is provided by circuit 71 and the commands are implemented by the CPU 70 of the processor 7.

The operation of the device of FIG. 2 will now be described in detail with reference to FIGS. 3 and 4. For the purpose of FIGS. 3 and 4, it is assumed that the source 10 which is connected to input 6 and the utilization device 11 which is connected to output 5 is a video tape recorder/player which is coupled to the workstation 2 via an RS 422 interface operating according to the same protocol as the transfer device 3.

Playback

Referring to FIG. 3, firstly the workstation 2 cues-up the store 1. The workstation 2 as a SCSI initiator issues the SCSI-2 COPY command 30 to the transfer device 3 as an SCSI target. The transfer device is thereby instructed to copy blocks 31 of data specified in the COPY command from the store 1 into the RAM 24.

The VTR 11 which has previously been cued receives from the workstation 2 the RECORD command 32. The RECORD command is an RS 422 command sent via the RS 422 interface.

The blocks of data are transferred from the RAM 24 to the output port 5 via the output buffer 25.

At the desired time the workstation 2 issues a START command via the RS 422 interface, to the processor 7. The processor 7 implements the START command 33 synchronously with the next SYNC signal it receives by enabling reading out of data in the output buffer 25 to the output port 5. As data is read out of the buffer 25, more data is written into the buffer 25 from the RAM 24.

The SCSI COPY command causes data to be copied from the store 1 to the transfer device 3. The COPY command may define the data to be transferred in one of several ways. It may define the amount of data to be transferred.

Alternatively, the command may define a file to be transferred, the file being the data to be copied from the store 1. At the end of the file copying stops. Once the defined data has been transferred, transfer ceases and no more data is written into the RAM 24. Once the defined data has been transferred, the transfer device 3 enters an SCSI STATUS phase to inform the workstation of the status of the command, e.g. that the COPY command is complete.

Thereafter, the workstation issues the STOP command 34 to the VTR via the RS 422 interface. An operator could issue the STOP command before data transfer is complete. Data transfer ceases and the transfer device then enters the SCSI STATUS phase to inform the workstation that COPY is incomplete.

Record

Referring to FIG. 4, firstly the workstation 2 cues-up the store 1.

The workstation, as an SCSI initiator, issues the SCSI-2 COPY command 40 to the transfer device 3 as an SCSI target. The transfer device is thereby instructed to copy blocks of data from its buffer 4 to the store 1.

The workstation issues an RS 422 PLAY command 41 to the VTR acting as the source 10. The VTR has previously been cued, and begins to play back video data.

The workstation issues an RS 422 START command 42 to the processor 7 of the transfer device at a time defined to select the start of the data to be recorded in store 1. The processor 7 causes data to be written via the input buffer 26 into the RAM 24 beginning at the next SYNC signal after the START command. Blocks 43 of data are transferred from the RAM 24 via the SCSI interface to the store 1.

The workstation 2 issues a STOP command 44 via the RS 422 interface to the processor 7 at a time selected to define the end of the data to be recorded in the store 1. The processor 7 causes the writing of data into the input buffer 26 to cease at the next SYNC signal after receipt of the STOP command.

Thereafter the workstation issues a STOP command 45 via an RS 422 interface to the VTR 10.

Reading of data from the RAM 24 and to the store 1 continues after the RS 422 STOP command to the processor 7 until at least the buffer 26 is empty of data.

The transfer device 3 then enters an SCSI STATUS phase to inform the workstation of the status of the COPY command, e.g. that the COPY command is complete.

Various modifications would be apparent to those skilled in the art. For example, the FIFOs 25 and 26 may be omitted and only the RAM 24 used as a buffer store, or the RAM 24 may be omitted and separate input and output buffers used in place of FIFOs 25 and 26.

The store 1 may be a video tape recorder/player.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data transfer device comprising:
   a buffer having control means for controlling the transfer of data into and out of the buffer;
   a first input and output and a second input and output;
   a first interface coupled to the first input and output and to the control means, the first interface being arranged to cause the transfer of data to and from the buffer via the first input and output with an undefined time delay; and
   a second interface coupled to the control means for causing the control means to transfer data to and from the buffer via the second input and output, the second interface being arranged to cause the transfer to occur with a defined time delay.

2. A device according to claim 1 wherein the first interface is responsive to, and causes the control means to implement, a command to transfer data via the first input and output, the first interface being such that the command is implemented with the undefined delay from issuance of the command.

3. A device according to claim 2 wherein the second interface is responsive to, and causes the control means to implement, a command to transfer data via the second input and output, the second interface being such that the command is implemented with the defined delay from issuance of the command.

4. A device according to claim 3, wherein the control means has an input for receiving a timing reference signal and is arranged to transfer data via the input and output synchronously with the timing reference signal.

5. A device according to claim 1 wherein the buffer includes a first store and a second store, each having an input and an output,
   the input of the first store and the output of the second store forming the second input and output and the output of the first store and the input of the second store forming the first input and output, whereby
   the first store transfers data from the second input and output to the first interface and
   the second store transfers data from the first interface to the second input and output.

6. A device according to claim 1 wherein the buffer includes a RAM coupled to the first input and output and the second input and output.

7. A device according to claim 1 wherein the first interface is an SCSI interface.

8. A device according to claim 1 wherein the second interface is an RS 422 interface.

9. A data transfer device for transferring data between a synchronous domain in which data is synchronous with a timing reference signal and an asynchronous domain, the device comprising a buffer, having first and second data transfer ports, data transfer control means for controlling transfer of data to and from the buffer, a first interface for coupling the first port of the buffer to the asynchronous domain, and for coupling data transfer commands to the control means, the first interface effecting a first type of control on the timing of transfers to and from the buffer via the first data transfer port, and a second interface for coupling data transfer commands to the control means, the second interface effecting a second type of control on the timing of transfers to and from the synchronous domain via the second data transfer port.

10. A video signal processing system comprising a source of video synchronisation signals, means for processing video signals synchronously with the video synchronisation signals, means for storing video data, the storing means operating asynchronously of the synchronisation signals, a data transfer device for transferring data between the storing means and the processing means, control means for generating transfer commands and for controlling the transfer of data, an SCSI interface coupling the control means, the storing means and the transfer device whereby data is transferred between the transfer device and the storing means asynchronously with respect to the video synchronisation signals, and an RS422 interface, responsive to the video synchronisation signals for coupling transfer commands from the control means to the transfer device, to transfer data between the transfer device and the processing means synchronously with the synchronisation signals.

11. A system according to claim 10 wherein the data transfer device comprises a buffer having control means for controlling the transfer of data into and out of the buffer, a first input and output and a second input and output, and wherein the SCSI interface is coupled to the first input and output and to the control means, the SCSI interface being arranged to cause the transfer of data to and from the buffer via the first input and output asynchronously with respect to the video synchronisation signals, and wherein the RS422 interface is coupled to the control means for causing the control means to transfer data to and from the buffer via the second input and output, the second interface being arranged to cause the transfer to occur synchronously with the synchronisation signals.

12. A system according to claim 10 which includes a video record/playback apparatus.

13. A system according to claim 12, wherein the video record/playback apparatus comprises a video tape recorder/player coupled via the SCSI interface to the data transfer device.

* * * * *